United States Patent
Sakaki et al.

(10) Patent No.: US 6,710,838 B2
(45) Date of Patent: Mar. 23, 2004

(54) DISPLAY MODULE HAVING FLEXIBLE SUBSTRATES BENDING ALONG A SLOPE OF A SLOPED BACK SURFACE MEMBER

(75) Inventors: Yoichiro Sakaki, Tsu (JP); Hisao Kawaguchi, Nara (JP); Makoto Takeda, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/072,981

(22) Filed: Feb. 12, 2002

(65) Prior Publication Data

US 2002/0135726 A1 Sep. 26, 2002

(30) Foreign Application Priority Data

Mar. 26, 2001 (JP) .......................... 2001-088626

(51) Int. Cl.[7] ............... G02F 1/1345; G02F 1/1335; G09G 3/36
(52) U.S. Cl. ................. 349/149; 349/150; 349/152; 349/65; 345/102
(58) Field of Search ................. 349/149–152, 349/65; 345/87, 102

(56) References Cited

U.S. PATENT DOCUMENTS

| 4,862,153 | A | * | 8/1989 | Nakatani et al. ............... 345/80 |
| 5,436,744 | A | * | 7/1995 | Arledge et al. ............... 349/150 |
| 5,978,060 | A | * | 11/1999 | Nakawaki et al. ........... 349/150 |
| 6,417,897 | B1 | * | 7/2002 | Hashimoto .................... 349/65 |
| 6,456,344 | B1 | * | 9/2002 | Nemoto et al. ................ 349/64 |
| 6,466,195 | B1 | * | 10/2002 | Hashimoto et al. ......... 345/102 |

FOREIGN PATENT DOCUMENTS

| JP | 4-88320 | 3/1992 |
| JP | 7-43709 | 2/1995 |

* cited by examiner

*Primary Examiner*—Tarifur R. Chowdhury
(74) *Attorney, Agent, or Firm*—Birch, Stewart, Kolasch & Birch, LLP (57) ABSTRACT

In a display module of the present invention, a light guide plate, having a cross sectional slope with respect to a display surface of a liquid crystal panel, is provided face to face behind the liquid crystal panel. Source TCPs and gate COFs, which are connected to the liquid crystal panel so as to make a right angle with each other, are respectively so extended as to reach to the back surface of the light guide plate. The gate COFs are bent along the slope of the light guide plate so that the gate COFs are so extended as to reach to the back surface of the light guide plate.

11 Claims, 10 Drawing Sheets

DISPLAY MODULE HAVING FLEXIBLE SUBSTRATES BENDING ALONG A SLOPE OF A SLOPED BACK SURFACE MEMBER

FIELD OF THE INVENTION

The present invention relates to a display module, such as a liquid crystal module, in which a member (a sloped back surface member), such as a light guide plate of a backlight, having a sloped back surface is provided face to face behind a display panel such as a liquid crystal panel, a slope of the sloped back surface member being caused by a thickness difference between both ends thereof, and in which a flexible substrate for a signal line drive circuit and a flexible substrate for a scanning line drive circuit are respectively so extended as to reach to a back surface of the sloped back member, where the flexible substrate for the signal line drive circuit and the flexible substrate for the scanning line drive circuit are connected to the display panel so as to make a right angle with each other.

BACKGROUND OF THE INVENTION

Japanese Unexamined Patent Application Tokukaihei No. 7-43709 (Publication date: Feb. 14, 1995), for example, discloses a liquid crystal module of a conventional TCP (Tape Carrier Package) mounting method.

Figure 9A:
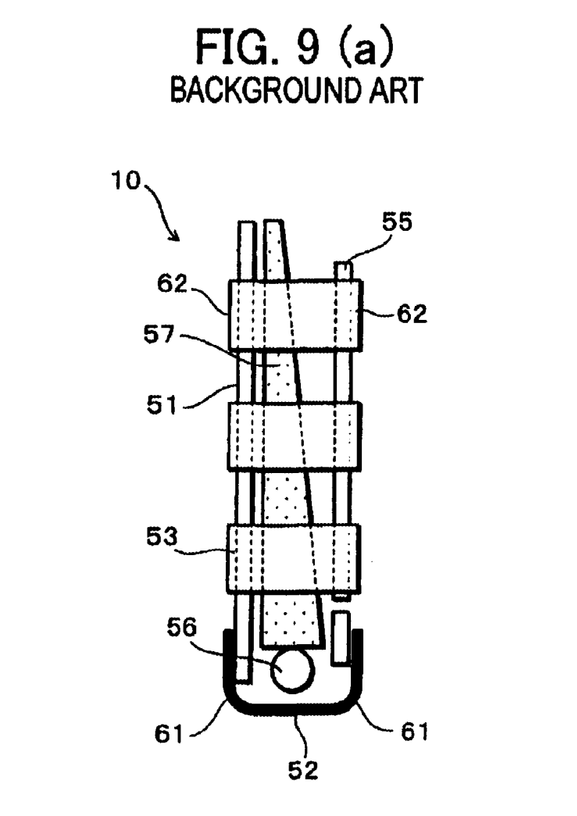
FIG. 9(a) is a side view of a conventional liquid crystal module and FIG. 9(b) is a plan view thereof.
Figure 9B:
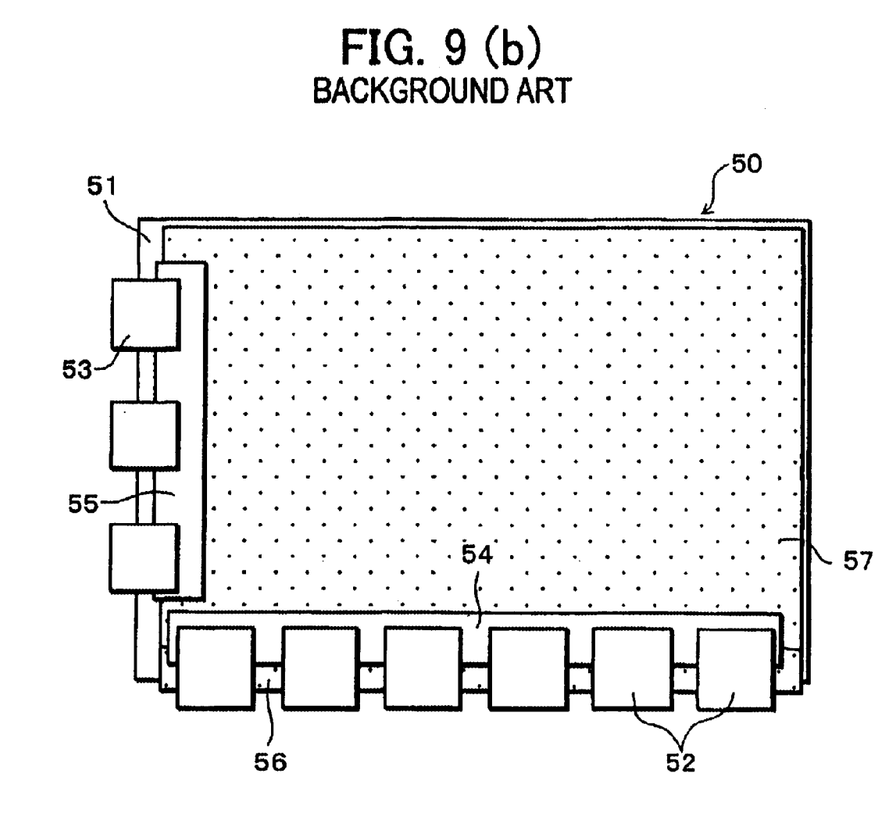

In a liquid crystal module 50 of this kind, as shown in FIGS. 9(a) and 9(b), a liquid crystal panel 51 is connected with source TCPs 52 and gate TCPs 53 aligned along an edge of a flat, rectangular shape of the crystal panel 51, and each extension tip of the source TCPs 52 is connected with a source PWB (Printed Wiring Board) 54 while each extension tip of the gate TCPs 53 is connected with a gate PWB 55.

Figure 10:
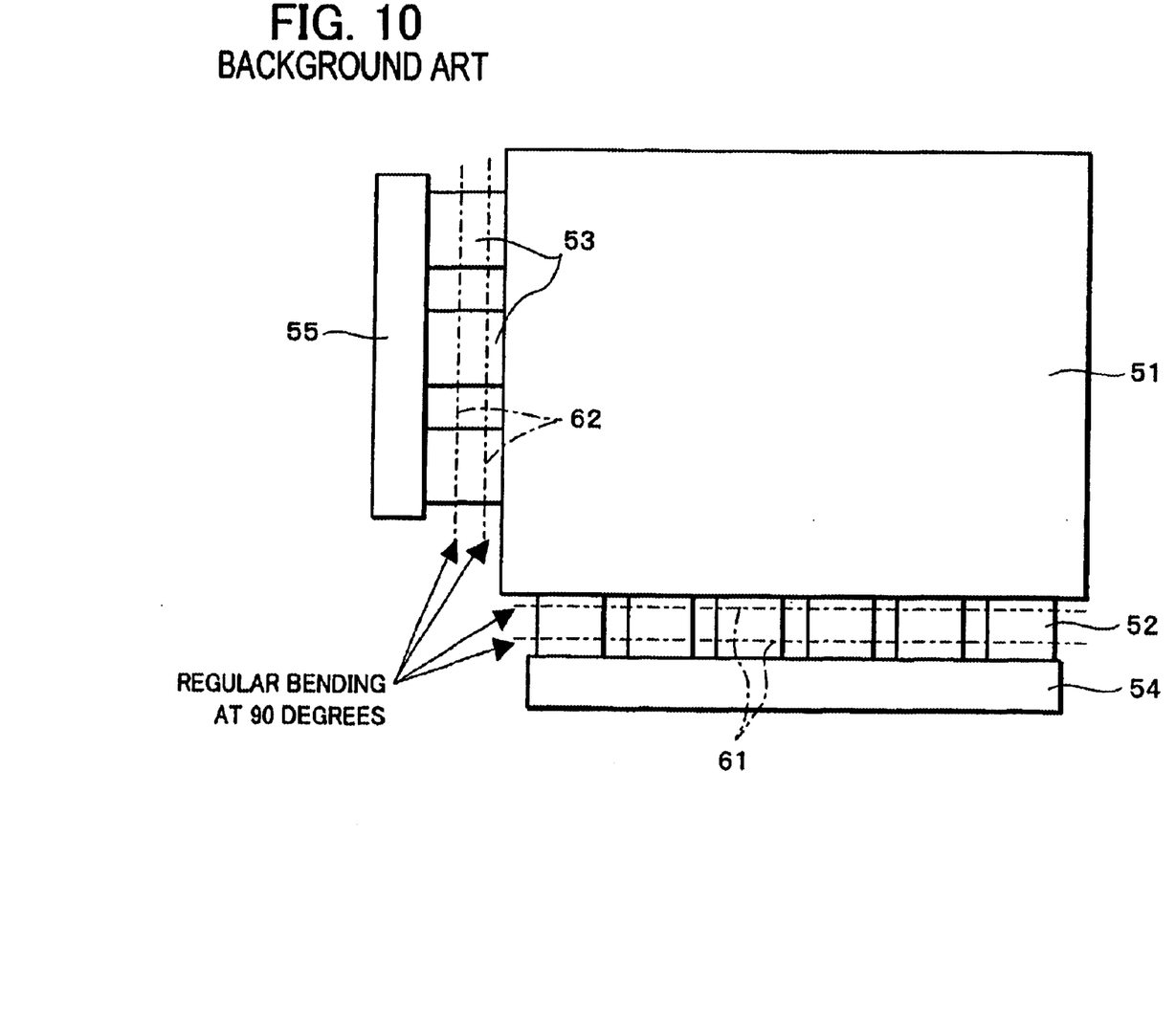
FIG. 10 is a plan view of the gate TCPs and the source TCPs of the conventional liquid crystal module, when the gate TCPs and the source TCPs are spread.

The source TCPs 52 and the gate TCPs 53 are bent at substantial 90 degrees as shown in FIG. 9(a), along two folding lines 61 and two folding lines 62 shown in FIG. 10, in such a manner that a backlight 56 and other members are wrapped. At this point, all of the source TCPs 52 and the gate TCPs 53, which are consecutively aligned, are bent at identical points so as to be parallel to a rectangular parallelopiped outer shape of the liquid crystal module 50.

Note that, the source TCP 52 and the gate TCP 53 are composed of a substrate of approximately 75 $\mu$m thickness (not shown), a Cu (copper) foil pattern being adhered to the substrate by using adhesive, and an IC (Integrated Circuit) chip connected to the Cu (copper) foil pattern. Since the source TCP 52 and the gate TCP 53 cannot be bent easily due to bending repulsion and the like caused by the approximately 75 $\mu$m thickness of the substrate, the source TCP 52 and the gate TCP 53 are bent in circular arc at the bending parts.

Most of the display modules with a backlight unit include a light guide plate 57 on the back of the liquid crystal panel 51, and a backlight 56 being composed of a lamp in a vicinity of one edge of the light guide plate 57. The light guide plate 57 is thickest at the edge near the lamp and becomes thinner toward an edge of the opposite side, so that all over the liquid crystal panel 51 is entirely subjected to light from the back light 56.

In the conventional display module, however, as the gate TCPs 53 are all folded at the identical points so as to be parallel to the rectangular parallelopiped outer shape of the liquid crystal module, the gate TCPs 53 have to be bent at the thickest part of the light guide plate 57. As a result, the completed liquid crystal module 50 has a dead space at the opposite side of the backlight 56. In addition, because of the bending repulsion of the substrate thickness, the gate TCP 53 can be bent in circular arc, but cannot be bent sharply; that is, the gate TCP 53 cannot be bent in a large curvature. On the other hand, when the gate TCP 53 is bent loosely in a small curvature, the gate TCP 53 is largely protruded from side edge of the liquid crystal panel.

As a result, there has been a problem that the liquid crystal module 50 can not be thinner in spite of its dead space.

SUMMARY OF THE INVENTION

In view of the conventional problem, an object of the present invention is to provide a display module which can be thinner by eliminating a dead space.

To accomplish the above-mentioned object, a display module of the present invention, such as a liquid crystal module, in which a sloped back surface member, such as a light guide plate, having a cross sectional slope with respect to a display surface of a display panel, is provided face to face behind the display panel, and a flexible substrate for a signal line drive circuit and a flexible substrate for a scanning line drive circuit are connected to the display panel so as to make a right angle with each other, and are respectively so extended as to reach to a back surface of the sloped back surface member, wherein the one of the flexible substrate for the signal line drive circuit and the flexible substrate for the scanning line drive circuit is so extended as to reach to the back surface of the sloped back surface member in such a manner that the one of the flexible substrate for the signal line drive circuit and the flexible substrate for the scanning line drive circuit is bent along the slope of the sloped back surface member.

In the display module of the invention such as the liquid crystal module, the flexible substrate for the signal line drive circuit and the flexible substrate for the scanning line drive circuit, which are connected to the display panel so as to make a right angle with each other, are respectively so extended as to reach to the back surface of the sloped back surface member such as the light guide plate, for example.

Conventionally, even with the sloped back surface member such as the light guide plate having the sloped back surface, the liquid crystal module has a dead space, because the flexible substrate for the signal line drive circuit and the flexible substrate for the scanning line drive circuit are bent at substantial 90 degrees along a rectangular parallelopiped shape of the liquid crystal module in their extending directions. As a result, there has been a problem that the display module cannot be thinner.

In the present invention, however, one of the flexible substrate for the signal line drive circuit and the flexible substrate for the scanning line drive circuit is bent along the slope of the sloped back surface member. For this reason, a folding line is in an oblique direction. As a result, it is possible to bend, along the slope of the sloped back surface member, one of the flexible substrate for the signal line drive circuit and the flexible substrate for the scanning line drive circuit that is in a direction parallel to the slope of the sloped back surface member. This enables the display module to eliminate the dead space.

Accordingly, it is possible to provide the display module which can be thinner by eliminating a dead space.

For a fuller understanding of the nature and advantages of the invention, reference should be made to the ensuing detailed description taken in conjunction with the accompanying drawings.

DESCRIPTION OF THE EMBODIMENTS

First Embodiment

An embodiment of the present invention is explained below. In the present embodiment, a liquid crystal module using a TFT (Thin Film Transistor) is explained as a display module, but the present invention is not limited to this. The display module may be a liquid crystal module using a Duty (Duty driving method) or an MIM (Metal Insulator Metal) and the like. In addition, the display module may be a display module other than the liquid crystal module.

Figure 1:
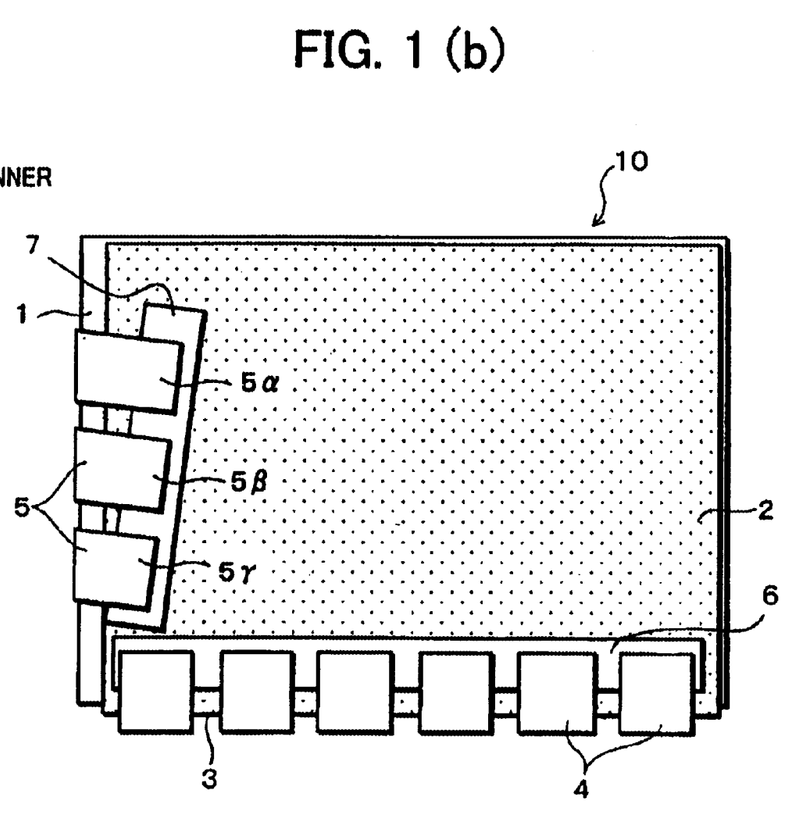
FIG. 1(a) is a side view of an embodiment of a liquid crystal module of the present invention and FIG. 1(b) is a plan view of the liquid crystal module.

As illustrated in FIGS. 1(a) and 1(b), a liquid crystal module 10 of the present embodiment is provided with a liquid crystal panel 1 as a rectangular display panel, and a sloped back surface member such as a light guide plate 2. The sloped back surface member (a back irradiation member), having a cross sectional slope (a slope surface, a back surface) 2c with respect to a display surface 1a of the liquid crystal panel 1, is provided face to face behind the liquid crystal panel 1. The light guide plate 2 is cross-sectionally thickest at an edge 2a at one side, as shown in FIG. 1(a), and cross-sectionally thinner at an edge 2b at the opposite side in comparison with the edge 2a. For this reason, the light guide plate 2 has the back surface, which has the cross sectional slope 2c, so that the back surface is not parallel to the display surface 1a of the liquid crystal panel 1.

A backlight (a light source) 3 is provided in a vicinity of the edge 2a, which is the thicker side of the light guide plate 2. The light guide plate 2 guides outgoing light of the backlight 3 from its sides, reflects the light on the slope 2c, and irradiates the light toward the liquid crystal panel 1.

On the other hand, the liquid crystal panel 1 in the liquid crystal module 10 is provided with source TCPs (Tape Carrier Package) 4 as flexible substrates for a signal line drive circuit and gate COFs (Chip On Film) 5 as flexible substrates for a scanning line drive circuit. The source TCPs 4 and the gate COFs 5 are connected from edges of the liquid crystal panel 1 so as to make a right angle with each other. The respective source TCPs 4 and the respective gate COFs 5 are consecutively aligned in line in a plural number in the respective directions. In addition, the source TCPs 4 are connected to a source PWB (Printing Wiring Board) 6 and the gate COFs 5 are connected to a gate PWB 7. Further, the source TCPs 4 and the gate COFs 5 are extended from the edge 2a and a side edge of the light guide plate 2 so as to reach to the back surface.

As described above, the liquid crystal module 10 of the present embodiment employs both of a COF mounting method and a TCP mounting method, but the present invention is not limited to this. The flexible substrate for the scanning line drive circuit may be a gate TCP as described later in a second embodiment, for example. Likewise, a source COF may be used instead of the source TCP 4.

A method of connecting the liquid crystal panel 1 with the source TCPs 4 in the liquid crystal module 10 is exactly identical with the conventional method. By using an ACF (Anisotropic Conductive Film; not shown), the liquid crystal panel 1 and each of the source TCPs 4 are connected collectively. The TCPs 4 are located as in the conventional method. The TCP is described in detail in the second embodiment.

Figure 3:
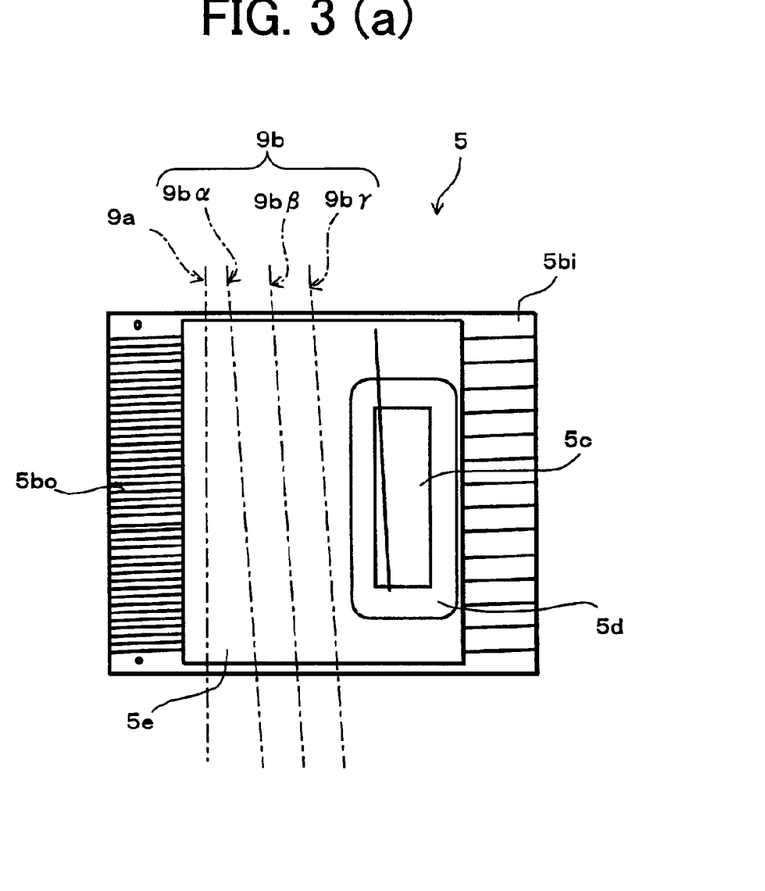
FIG. 3(a) is a plan view of a structure of the gate COF of the liquid crystal module and FIG. 3(b) is a sectional view thereof.

On the other hand, as shown in FIGS. 3(a) and 3(b), the gate COF 5 is composed of a substrate material 5a of 40 μm thickness, on which a Cu (copper) film (a conductive film) 5b of approximately 10 μm thickness is patterned without using adhesive. Because the thickness of the substrate material 5a that is usually used is 40 μm, in the present invention, no more than 40 μm thickness of the substrate material 5a enables the gate COF 5 to be easily bent obliquely as described later.

The substrate material 5a does not have an oblique folding slit 26, which is formed in the TCP mounting method described in the second embodiment. In addition, the substrate material 5a is provided with an IC (Integrated Circuit) chip 5c, which is bonded on an ILB (Inner Lead Bonding) pad (not shown) patterned on the substrate material 5a and is sealed with a sealing resin 5d. The Cu (copper) film 5b is covered with a resist 5e, which protects a pattern of the Cu (copper) film 5b electrically and mechanically, whereas an input terminal 5bi, an output terminal 5bo and the ILB pad are left uncovered. As for a connecting method of the liquid crystal panel 1 and each of the gate COFs 5, the liquid crystal panel 1 and each of the gate COFs 5 are respectively connected collectively by using the Anisotropic Conductive Film (ACF; not shown).

Compared to the TCP, which generally has a substrate material thickness of 75 μm, the gate COF 5 has a substrate material 5a whose thickness is no more than 40 μm. Because the substrate material 5a of the gate COF 5 is thin and the gate COF 5 does not use adhesive, the gate COF 5 has a structure flexible for bending. In addition, any region of the gate COF 5 which is covered with the resist 5e can be bent.

Moreover, as for the connection of the source TCPs 4 and the source PWB 6, as well as that of the gate COFs 5 and the gate PWB 7 is carried out by collective collection by using the Anisotropic Conductive Film (ACF; not shown), in the present embodiment.

In other words, the above described procedure is exactly identical with the conventional connecting procedure, except that the gate COFs 5 are provided at a gate side. Therefore, the liquid crystal module 10 of the present embodiment does not require special measures such as an installation of a novel device.

Next, a step of assembling the liquid crystal module 10 of the present embodiment is explained.

Figure 2:
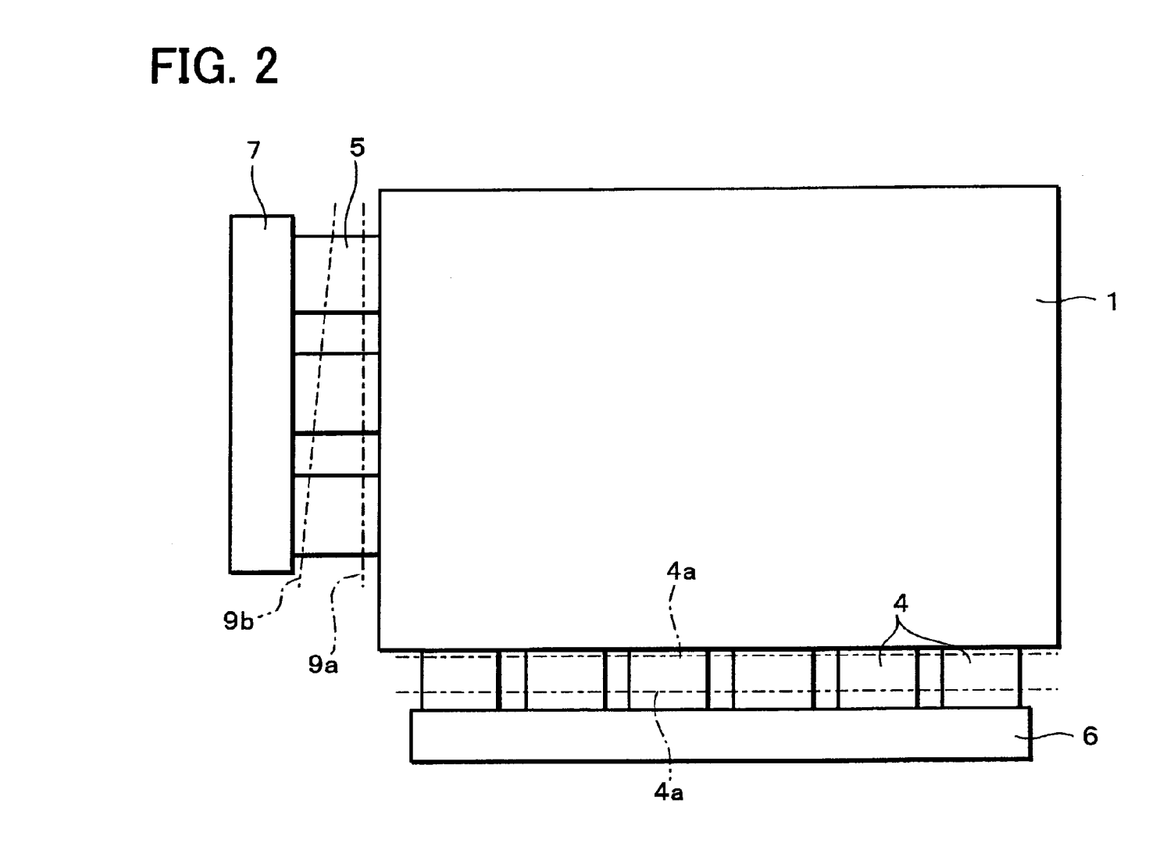
FIG. 2 is a plan view of gate COFs and source TCPs of the liquid crystal module, when the gate COFs and the source TCPs are spread.

In the present embodiment, when the source TCPs 4 and the gate COFs 5 in the liquid crystal module 10 are connected, as shown in FIG. 2, the source PWB 6 and the gate PWB 7 can be spread out externally from the liquid crystal panel 1, because the source TCPs 4 and the gate COFs 5 are flexible. On the source TCPs 4, folding slits (not shown) are formed to bent bending parts easily as illustrated in FIG. 2. The folding slits enable the source TCP 4 having a 75 μm substrate material thickness to be bent easily at a right angle at two folding lines 4a. Details of this are described later in the second embodiment.

On the other hand, as illustrated in FIG. 2, the gate COFs 5 are bent with respect to a regular folding line 9a and an oblique folding line 9b, which are indicated by alternate long and short dash lines. Therefore, the gate COFs 5 are provided with no folding slit as provided in the source TCPs 4 (not shown), because the gate COF 5 can be bent easily without slits due to the substrate material 5a of no more than 40 μm. In the present embodiment, the oblique folding line 9b of the gate COF 5 is a folding line for bending the gate COF 5 along the slope 2c of the light guide plate 2.

After spreading the source TCPs 4 and the gate COFs 5 shown in the FIG. 2, the source TCPs 4 and the gate COFs 5 are bent, so as to wrap the backlight 3 and the light guide plate 2, as shown in FIGS. 1(a) and 1(b). At this point, the source TCPs 4 are bent with respect to the folding lines 4a twice, each at 90 degrees, so as to wrap the backlight 3, as described later in the second embodiment. All of the source TCPs 4 are bent at the identical points.

On the other hand, as for bending of the gate COFs 5, a first bending part near the liquid crystal panel 1 is bent with respect to the regular folding line 9a at substantial 90 degrees so as to be parallel to the outer shape of the liquid crystal panel 1, as in the conventional method. On the other hand, a bending part near the gate PWB 7 is bent along the oblique folding line 5b, so as to have a certain angle and not to be parallel to the outer shape of the liquid crystal panel 1. The above-mentioned angle is determined by a thickness difference of the light guide plate 2 and a cumulative length of the consecutive gate COFs 5. In this manner, the gate COFs 5 are bent along the slope 2c of the light guide plate 2. In other words, as illustrated in FIGS. 1(a) and 1(b), the thickness of the light guide plate 2 determines at which points gate COFs 5α, 5β, and 5γ are bent. The thinner part of the light guide plate 2 causes the consecutive gate COFs 5α to be bent at closer points to the liquid crystal panel 1 compared with the consecutive gate COFs 5β and 5γ, on contrary, the thicker part of the light guide plate 2 causes the consecutive gate COFs 5γ to be bent at the furthest points to the liquid crystal panel 1 compared with the gate COFs 5α and 5β, as indicated by individual oblique folding lines 9bα, 9bβ, and 9bγ shown in FIG. 3.

By bending the gate COFs 5 as described above, as shown in FIG. 1(a), it is possible to make an area 8, which used to be a dead space. This enables the liquid crystal module 10 to be thinner.

As described above, in the liquid crystal module 10 of the present embodiment, the source TCPs 4 and the gate COFs 5, which are connected to the liquid crystal panel 1 so as to make a right angle with each other, are provided so as to be respectively extended to reach to the back surface of the light guide plate 2.

Conventionally, because the source TCPs 4 and the like are bent at a substantial right angle along the rectangular parallelopiped shape of the liquid crystal module 10 in an extending direction of the source TCPs 4, the liquid crystal module 10 has a dead space, even though the liquid crystal module 10 is provided with the light guide plate 2 having the sloped back surface. As a result, there has been a problem that the liquid crystal module 10 cannot be thinner.

In the present embodiment, however, the gate COFs 5, which are either the source TCPs 4 or the gate COFs 5, are bent along the slope 2c of the light guide plate 2. For this reason, the oblique folding line 9b is in an oblique direction. As a result, it is possible to bent the gate COFs 5, which are extended to the sloped surface of the slope 2c of the light guide plate 2, along the sloped surface of the slope 2c of the light guide plate 2, thereby eliminating the dead space conventionally existed, namely the area 8.

As a result, it is possible to provide the liquid crystal module 10 which can be thinner by eliminating the dead space. In addition, this enables the liquid crystal module 10 to be lighter in weight.

Further, in the liquid crystal module 10 of the present embodiment, the gate COF 5, which is so extended as to reach to the back surface of the light guide plate 2 in such a manner that the gate COF 5 is bent along the slope 2c of the light guide plate 2, is made of a Chip On Film (COF) having a substrate thickness of 40 μm or less.

Conventionally, because a TCP mounting method is generally used for the flexible substrate for the signal line drive circuit and the flexible substrate for the scanning line drive circuit, the substrate cannot be bent easily because of approximately 75 μm thickness of the substrate.

In the present embodiment, a COF mounting method, in which the substrate thickness is of 40 μm or less, is employed instead of the TCP mounting method. In the present invention, the COF is such a COF that, the Cu (copper) film 5b, which is an electrode wiring, is generally joined directly with the substrate material 5a without using adhesive.

According to this arrangement, since the Cu (copper) film 5b is directly joined with the substrate material 5a, the thickness of the COF is able to be thinner, which enables the COF to be easily bent.

Because of this, the gate COF 5 having the substrate thickness of 40 μm or less is bent easier than the conventional TCP and also easily bent obliquely. For this reason, the gate COF 5 can be bent easily along the slope 2c of the light guide plate 2.

As a result, it is possible to provide the liquid crystal module 10 which can be thinner by eliminating the dead space.

Figure 4:
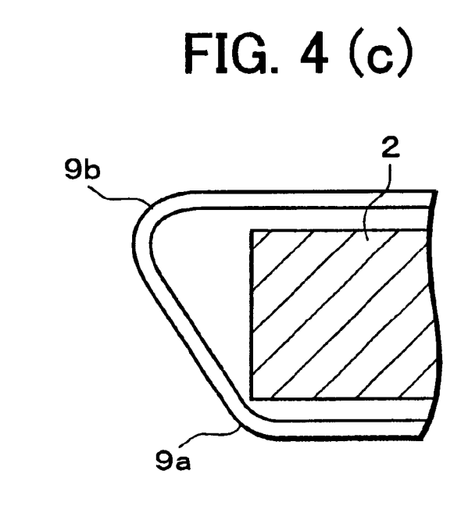
FIGS. 4(a) to 4(c) are sectional views of the gate COF illustrating how the gate COF is folded.

The present invention is not limited to the above embodiment and may have various modifications within a scope of the present invention. In the above embodiment, for example, the bending parts at the regular folding line 9a and the oblique folding line 9b are bent at substantial 90 degrees, as shown in FIGS. 1(a) and 1(b), but the bending angles are not limited to the substantial 90 degrees. Thus bending angles may be in circular arc, or at a smooth obtuse angle or an acute angle, as shown in FIGS. 4(a), 4(b), and 4(c). In FIG. 4 (c), the bending parts are actually twisted to have a boat-like shape, and the oblique folding line 9b is protruded out of the light guide plate 2 in a plan view, as shown in FIG.

Figure 5:
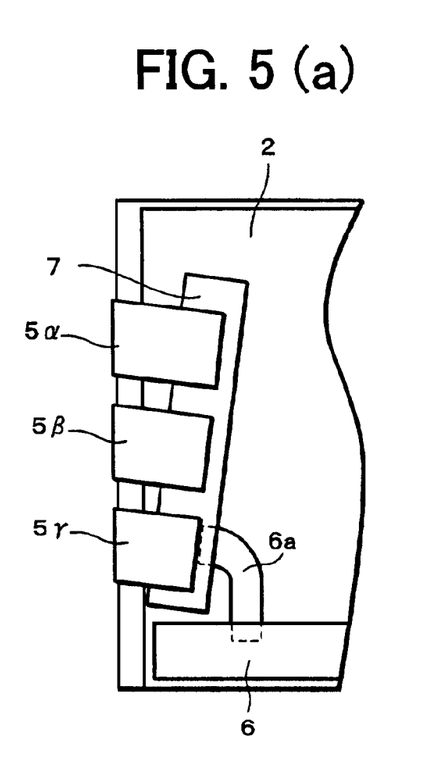
FIG. 5(a) is a schematic plan view of the gate COF which is folded as in FIG. 4(a)
FIG. 5(b) is a schematic plan view of the gate COF which is folded as in FIG. 4(c).

5(b). In other words, the oblique folding line 9b near the gate PWB 7 has a certain angle for folding the gate COFs 5, as shown in FIG. 2, but the present invention is not limited to this. The regular folding line 9a near the liquid crystal panel 1 may have a certain angle. In this case, as shown in FIG. 5(b), a gate COF 5β is protruded more than a gate COF 5γ, while a gate COF 5α is protruded more than the gate 5β. In this case, however, the gate PWB 7 and the source PWB 6 can be placed at a right angle with each other.

As shown in FIG. 5(a), when the gate PWB 7 is inclined with respect to an edge line of the light guide plate 2, a connector 6a for connecting the gate PWB 7 with the source PWB 6 need to have a curve in order to connect the gate PWB 7 with the source PWB 6. When the gate PWB 7 and the source PWB 6 are placed at a right angle with each other, as shown in FIG. 5(b), however, the connector 6a can be linear to connect the gate PWB 7 with the source PWB 6.

Figure 6:
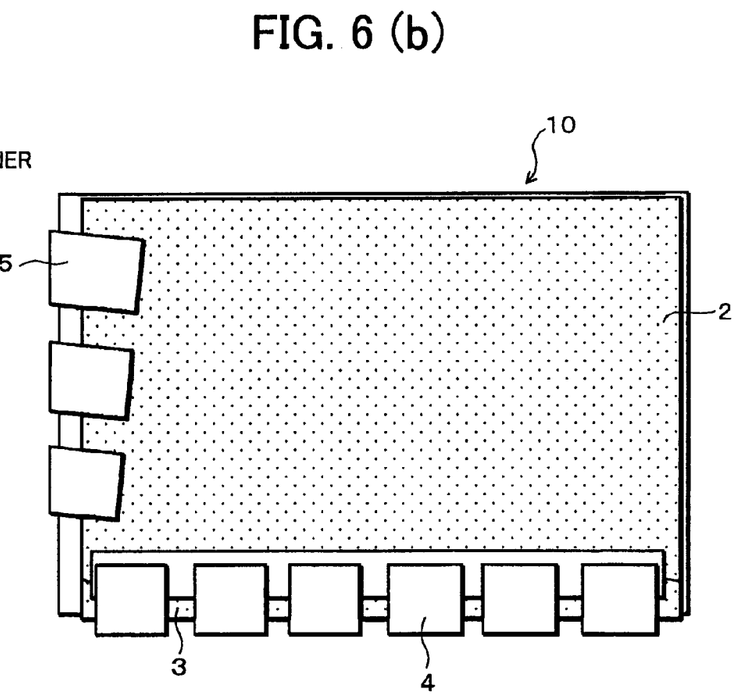
FIG. 6(a) is a side view illustrating a liquid crystal module in which a gate PWB does not appear on a back surface of a light guide plate.
FIG. 6(b) is a plan view thereof.

In the present embodiment, as shown in FIG. 1(b), the gate COFs 5 are connected with the gate PWB 7, which are placed behind the light guide plate 2, but the present invention is not limited to this. As shown in FIGS. 6(a) and 6(b), the gate PWB 7 does not need to be put visibly at tips of the gate COFs 5, but may be put on a side part or another part of the liquid crystal module 10 in a way not shown.

Second Embodiment

Another embodiment of the present invention is described below. For convenience of explanation, members which have identical functions with the members that are illustrated in the figures of the first embodiment are put with the same reference numerals and are not explained in the present embodiment. Several features explained in the first embodiment may be incorporated in the present embodiment.

In the liquid crystal module 10 of the first embodiment, the gate COFs 5 are used as the flexible substrates for the scanning line drive circuit, but the present invention is not limited to this. Gate TCPs 20 may also be used as the flexible substrates for the scanning line drive circuit, as shown in FIGS. 7(a) and 7(b), in a way which is described below.

Figure 7:
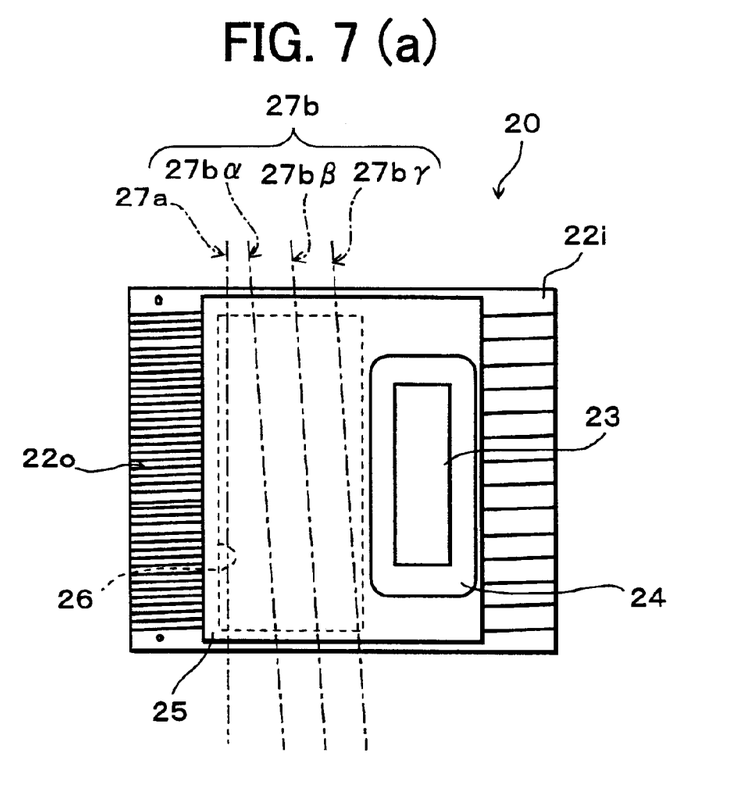
FIG. 7(a) is a plan view of a liquid crystal module of another embodiment of the present invention, illustrating a structure of a gate TCP of the liquid crystal module.
FIG. 7(b) is a sectional view thereof.

The gate TCP 20 in a liquid crystal module 30 of the present embodiment is made of, as shown in FIGS. 7(a) and 7(b), for example, a substrate material 21 of 75 μm thickness, on which a Cu (copper) foil 22 of approximately 10 μm thickness is patterned. The Cu (copper) foil 22 on the substrate material 21 is bonded by using adhesive (not shown).

Further, on an opening part 21a in the substrate material 21, an IC chip 23 is mounted, which is bonded on an ILB pad (not shown) patterned on the Cu (copper) foil 22 on the substrate material 21 and sealed by using a sealing resin 24. The Cu (copper) foil 22 is covered with an upper resist 25, so as to protect a pattern of the Cu (copper) foil 22 electrically and mechanically, whereas an input terminal 22i, an output terminal 22o and the ILB pad are left uncovered.

The structure above is identical to the conventional structure of the TCP, which is hard to be bent because the substrate material thickness of the TCP is generally 75 μm, and because the Cu (copper) foil 22 on the substrate material 21 is bonded by using adhesive, and the like reason. In other words, the gate TCP 20 cannot be bent easily because of its strong bending repulsion against bending due to its film thickness, and forcible bending of the gate TCP 20 may break and peel off the Cu (copper) foil 22 at a layer of the adhesive. Accordingly, at present, the gate TCP 20 can be curved at a substantial right angle, as much as its bending repulsion allows, but cannot be bent in a large curvature due to the bending repulsion. Namely, the more the gate TCP 20 is bent obliquely along the slope 2c of the light guide plate 2, the larger the bending repulsion becomes. As a result, the conventional structure of the TCP cannot be bent obliquely along the slope 2c of the light guide plate 2.

Figure 8:
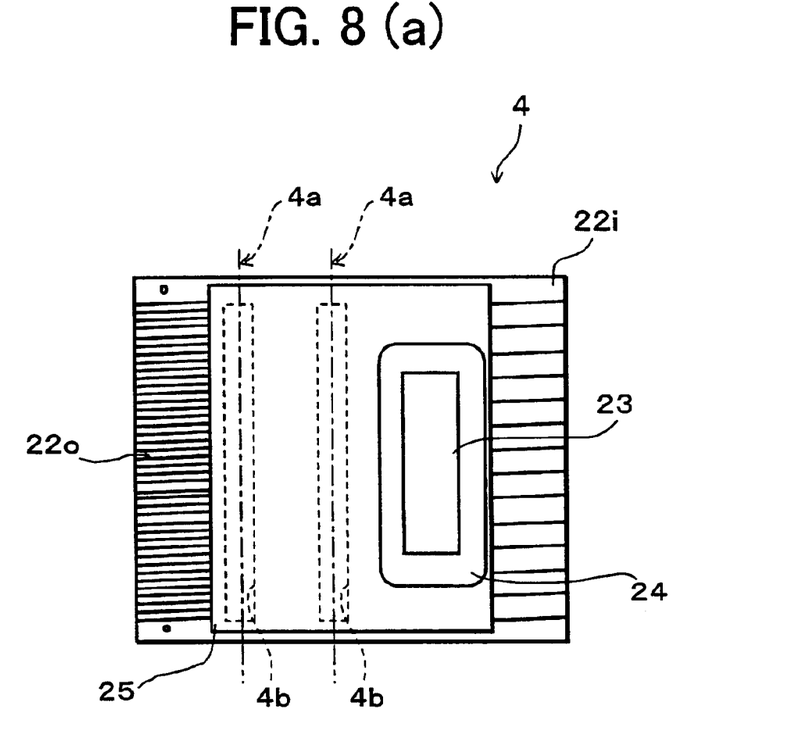
FIG. 8(a) is a plan view of a structure of a source TCP of the liquid crystal module and FIG. 8(b) is a sectional view thereof.

To solve the above-mentioned problem, as shown in FIGS. 8(a) and 8(b), for example, the source TCP 4, which does not have to be bent obliquely along the slope 2c of the light guide plate 2, can have a sufficiently large curvature of bending by being bent with respect to the folding lines 4a, which are given by two folding slits 4b provided therein. However, this is not a satisfactory solution to the problem.

In the gate TCP 20, however, providing of the two folding slits 4b cannot be a solution to the oblique bending of the gate TCP 20 along the slope 2c of the light guide plate 2 because the folding lines are oblique.

Accordingly, in the present embodiment, as shown in FIGS. 7(a) and 7(b), formed over the substrate material 21 below the upper resist 25 that is applied on the substrate material 21, is an oblique folding slit 26 whose plane shape is a rectangular. The oblique folding slit 26, as shown in FIG. 7(a), is a notch of the substrate 21 in an area of oblique folding lines 27b in which each of a regular folding line 27a and three individual oblique folding lines 27bα, 27bβ, and 27bγ pass through. In addition, the oblique folding slit 26 is provided with a lower resist 28 for reinforcement and protection. As described above, the oblique folding slit 26 is a concave part, which is the notched area of the substrate material 21, leaving both edges of the bending part. This is because strength of the bending part is deteriorated if the edges are also notched. Accordingly, if there is clearly no problem in terms of strength, the both edges may be notched.

Because of this, in an area where each of the regular folding line 27a and the individual oblique folding lines of 27bα, 27bβ, and 27bγ pass through, the substrate material 21 exists only on both sides of the gate TCP 20, and other parts are the upper resist 25, the lower resist 28 and the like. This allows the gate TCP 20 to be bent easily when the gate TCP 20 is bent with respect to the regular folding lines 27a and each of the oblique folding lines of 27bα, 27bβ, and 27bγ. The upper resist 25 and the lower resist 28 do not interfere with the oblique bending of the gate TCP 20 because of its small bending repulsion in comparison to the substrate material 21.

Accordingly, again in case the gate TCP 20 is used, because the gate TCP 20 can be bent easily along the slope 2c of the light guide plate 2, the thickness of the liquid crystal module 10 can be thinner. Note that, in the above embodiment, the oblique folding slit 26 is a large slit which is used in common for the regular folding line 27a and the individual oblique folding lines 27bα, 27bβ, and 27bγ, but the present invention is not limited to this. A plurality of slits, respectively corresponding to each of the regular folding line 27a and the individual oblique folding lines 27bα, 27bβ, and 27bγ may be provided. In this case, however, a complicated process is needed to form the plurality of slits because each slit has to be formed so as to correspond to each of the individual oblique folding lines 27bα, 27bβ, and 27bγ for each of the gate COFs 5α, 5β, and 5γ.

As described above, in the liquid crystal module 30 of the present embodiment, the gate TCP 20, which is so extended as to reach to the back surface of the light guide plate 2 in such a manner that the gate TCP 20 is bent along the slope 2c of the light guide plate 2, has an oblique folding slit 26 at a bending part.

For this reason, even when the gate TCP 20 employs the TCP mounting method, the oblique folding slit 26 makes a thickness of the bending part thinner and makes the bending repulsion of the substrate material 21 smaller. This enables the gate TCP 20 to be bent along the slope 2c of the light guide plate 2.

The oblique folding slit 26 is not only a slit for bending of vertical direction, but also a slit for oblique bending, which allows the gate TCP 20 to be bent easily along the slope 2c of the light guide plate 2.

As a result, even in the conventional TCP mounting method, it is possible to provide the liquid crystal module 30, which can be thinner by eliminating the dead space.

In addition, in the present embodiment, the source TCP 4 is provided with the two folding slits 4b for the two folding lines 4a, but the source TCP 4 may also be provided with a large slit which is used in common for two folding lines 4a.

As described above, the display module of the present invention may be so adopted that the one of the flexible substrate for the signal line drive circuit and the flexible substrate for the scanning line drive circuit is made of a COF having a substrate thickness of 40 μm or less, where the one of the flexible substrate for the signal line drive circuit and the flexible substrate for the scanning line drive circuit is so extended as to reach to the back surface of the sloped back surface member in such a manner that the one of the flexible substrate for the signal line drive circuit and the flexible substrate for the scanning line drive circuit is bent along the slope of the sloped back surface member.

According to the above invention, the one of the flexible substrate for the signal line drive circuit and the flexible substrate for the scanning line drive circuit is made of a COF having a substrate thickness of 40 μm or less, which is so extended as to reach to the back surface of the sloped back surface member and is bent along the slope of the sloped back surface member.

In other words, conventionally, because a TCP mounting method is generally used for the flexible substrate for the signal line drive circuit and the flexible substrate for the scanning line drive circuit, the substrate cannot be bent easily because of the approximately 75 μm thickness of the substrate.

In the present invention, a COF (Chip On Film) mounting method is employed instead of the TCP (Tape Carrier Package) mounting method and the COF has the substrate thickness of 40 μm or less. The COF is such a COF that its electrode wiring is generally joined directly with the substrate material without using adhesive.

Because of this, the COF having the substrate thickness of 40 μm or less is bent easier than the conventional TCP and easily bent obliquely. For this reason, the COF can be bent easily along the slope of the sloped back surface member.

As a result, it is possible to provide the display module which can be thinner by eliminating the dead space.

In addition, as described above, the display module of the present invention may be so adopted that the one of the flexible substrate for the signal line drive circuit and the flexible substrate for the scanning line drive circuit has an oblique folding slit at a bending part, where the one of the flexible substrate for the signal line drive circuit and the flexible substrate for the scanning line drive circuit is so extended as to reach to the back surface of the sloped back surface member in such a manner that the one of the flexible substrate for the signal line drive circuit and the flexible substrate for the scanning line drive circuit is bent along the slope of the sloped back surface member.

According to the above invention, the one of the flexible substrate for the signal line drive circuit and the flexible substrate for the scanning line drive circuit has an oblique folding slit at a bending part, where the one of the flexible substrate for the signal line drive circuit and the flexible substrate for the scanning line drive circuit is so extended as to reach to the back surface of the sloped back surface member in such a manner that the one of the flexible substrate for the signal line drive circuit and the flexible substrate for the scanning line drive circuit is bent along the slope of the sloped back surface member.

As a result, for example, even when the flexible substrate for the signal line drive circuit or the flexible substrate for the scanning line drive circuit employs the TCP mounting method, the oblique folding slit makes a thickness of the bending part thinner and makes the bending repulsion of the substrate material smaller, thereby making it possible to bend the flexible substrate along the slope of the sloped back surface member.

The oblique folding slit is not only a slit for bending of vertical direction, but also a slit for oblique bending, which allows easy bending along the slope of the sloped back surface member.

Because of this, even with the conventional TCP mounting method, it is possible to provide the display module, which can be thinner by eliminating the dead space.

Moreover, as described above, as to the above-mentioned display module, the display module of the present invention may be so adapted that the COF is such a COF that a conductive film, which is an electrode wiring of an IC (Integrated Circuit) chip, is directly joined with a substrate material.

According to this arrangement, since the conductive film is directly joined with the substrate material, the thickness of the COF is able to be thinner. In this way, it is possible to bend the COF easily.

Moreover, as described above, as to the above-mentioned display module, the display module of the present invention may be so adapted that the conductive film on the substrate material is covered with a resist, whereas an input terminal that receives image data, an ILB (Inner Lead Bonding) pad that is connected with the IC chip, and an output terminal that is connected with the display panel are left uncovered.

According to this arrangement, the resist protects the conductive film electrically and mechanically, thereby improving reliability of the COF.

Moreover, as described above, as to the above-mentioned display module, the display module of the present invention may be so adapted that the oblique folding slit is an integral concave part, which is a notched area of a substrate material of the one of the flexible substrate for the signal line drive circuit and the flexible substrate for the scanning line drive circuit, and through which a plurality of folding lines pass.

According to the arrangement, since the integral concave part includes the plurality of folding lines, positions of the folding lines are not fixed, but can be easily shifted, which makes it possible to realize the display module in the simple structure.

Further, since the slit for the plurality of folding lines is formed as the integral concave part, its manufacturing procedure can be simplified.

Moreover, as described above, as to the above-mentioned display module, the display module of the present invention may be so adapted that the oblique folding slit is an integral concave part, which is a notched area of a substrate material of the one of the flexible substrate for the signal line drive circuit and the flexible substrate for the scanning line drive circuit, leaving both edges of bending part.

With the simple structure, strength of the bending part can be improved.

Moreover, as described above, as to the above-mentioned display module, the display module of the present invention may be so adapted that the concave part is provided with a resist for reinforcement.

For this reason, reinforcement and protection of the bending part can be easily realized.

Furthermore, as described above, as to the display module of the above-mentioned display module, the display module of the present invention may be so adapted that the flexible substrate for the signal line drive circuit and the flexible substrate for the scanning line drive circuit, which are so extended as to reach to the back surface of the sloped back surface member, are placed so as to make a right angle with each other.

According to the arrangement, for example, as shown in the above-mentioned FIG. 5(b), the connector can be linear to connect the flexible substrate for the signal line drive circuit with the flexible substrate for the scanning line drive circuit, thereby reducing a length of the connector.

Moreover, the display module of the present invention can be explained as follows; a display module of the present invention may be provided with a display panel for displaying an image, a back irradiation member for irradiating an irradiated surface with light from a light source, the back irradiation member covering the irradiated surface of the display panel, and a driving flexible substrate for driving the display panel, the driving flexible substrate being connected to the display panel, and so extended as to reach to a back surface of the back irradiation member, wherein the back surface of the back irradiation member has a sloped surface sloped with respect to a display surface of the display panel, and the driving flexible substrate is bent along the sloped surface.

In the arrangement, the back surface of the back irradiation member has a sloped surface sloped with respect to a display surface of the display panel, and the driving flexible substrate is connected to the display panel and is bent along the sloped surface of the back irradiation member. As a result, in comparison to a case when the bending of the driving flexible substrate is not along the sloped surface, for example, the dead space on the sloped surface of the display module can be surely eliminated.

Note that, in the attached figures, only the sloped surfaces that are sloped at a constant angle (thus the slopes are flat) are shown for convenience, but the present invention is not limited to this. The sloped surface may be a curved surface that is not sloped at a constant angle.

Moreover, in the above-mentioned embodiment, described as an example of the back irradiation member is the light guide plate 2, which irradiates the liquid crystal panel (the display panel) 1 by reflecting the light from the back light (the light source) 3 on the slope (the sloped surface) 2c. However, the present invention is not limited to this. For example, the light from the light source may not be reflected on the sloped surface.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A display module comprising:
    a sloped back surface member, having a cross-sectional slope with respect to a display surface of a display panel, provided face-to-face behind the display panel; and
    a flexible substrate for a signal line drive circuit and a flexible substrate for a scanning line drive circuit, said flexible substrates being connected to the display panel to form a right angle with each other and extending to reach a back surface of the sloped back surface member,
    wherein at least one of the flexible substrates extends to reach to the back surface of the sloped back surface member in such a manner as to bend along the slope of the sloped back surface member, said sloped flexible substrate being made of a Chip On Film (COF) having a substrate thickness of 40 μm or less.

2. The display module as set forth in claim 1, wherein the COF has a conductive film, which is an electrode wiring of an IC (Integrated Circuit) chip, that is directly joined with a substrate material.

3. The display module as set forth in claim 2, wherein the conductive film on the substrate material is covered with a resist, and an input terminal that receives image data, an ILB (Inner Lead Bonding) pad that is connected with the IC chip, and an output terminal that is connected with the display panel are uncovered.

4. The display module as set forth in claim 1, wherein:
    the flexible substrate for the signal line drive circuit and the flexible substrate for the scanning line drive circuit, which are so extended as to reach to the back surface of the sloped back surface member, are placed so as to make a right angle with each other.

5. A display module comprising:
    a sloped back surface member, having a cross-sectional slope with respect to a display surface of a display panel, provided face-to-face behind the display panel; and
    a flexible substrate for a signal line drive circuit and a flexible substrate for a scanning line drive circuit, said flexible substrates being connected to the display panel to form a right angle with each other and extending to reach a back surface of the sloped back surface member,
    wherein at least one of the flexible substrates extends to reach to the back surface of the sloped back surface member in such a manner as to bend along the slope of the sloped back surface member, said sloped flexible substrate having an oblique folding slit at a bending part.

6. The display module as set forth in claim 5, wherein the oblique folding slit is an integral concave portion of a notched area of a substrate material of the sloped flexible substrate through which a plurality of folding lines pass.

7. The display module as set forth in claim 6, wherein the concave portion includes a resist for reinforcement.

8. The display module as set forth in claim 5, wherein the oblique folding slit is an integral concave portion of a notched area of a substrate material of the sloped flexible substrate leaving both edges of bending part.

9. The display module as set forth in claim 8, wherein the concave part includes a resist for reinforcement.

10. A display module, comprising:
    a display panel for displaying an image;
    a back irradiation member for irradiating an irradiated surface with light from a light source, the back irradiation member covering the irradiated surface of the display panel;
    and a driving flexible substrate for driving the display panel, the driving flexible substrate being connected to the display panel, and so extended as to reach to a back surface of the back irradiation member, wherein the back surface of the back irradiation member has a sloped surface sloped with respect to a display surface of the display panel, wherein the driving flexible substrate is bent along the sloped surface and has an oblique folding slit at a bending part, and wherein the driving flexible substrate is made of a Chip On Film (COF) having a substrate thickness of 40 $\mu$m or less.

11. A display module, comprising:

a display panel for displaying an image;

a back irradiation member for irradiating an irradiated surface with light from a light source, the back irradiation member covering the irradiated surface of the display panel;

and a driving flexible substrate for driving the display panel, the driving flexible substrate being connected to the display panel, and so extended as to reach to a back surface of the back irradiation member, wherein the back surface of the back irradiation member has a sloped surface sloped with respect to a display surface of the display panel, wherein the driving flexible substrate is bent along the sloped surface and has an oblique folding slit at a bending part.

* * * * *